United States Patent
Brett et al.

(10) Patent No.: US 7,444,867 B2
(45) Date of Patent: Nov. 4, 2008

(54) ACCELEROMETER AND RATE SENSOR PACKAGE FOR GRAVITY GRADIOMETER INSTRUMENTS

(75) Inventors: John Brett, Kinnelon, NJ (US); James Brewster, Lincoln Park, NJ (US)

(73) Assignees: Bell Geospace, Inc., Houston, TX (US); Lockheed Martin Corp., Bethesda, MD (US)

( * ) Notice: Subject to any disclaimer, the term of this patent is extended or adjusted under 35 U.S.C. 154(b) by 93 days.

(21) Appl. No.: 11/029,229

(22) Filed: Jan. 4, 2005

(65) Prior Publication Data

US 2006/0156810 A1    Jul. 20, 2006

(51) Int. Cl.
*G01V 7/00*    (2006.01)
(52) U.S. Cl. .................................. 73/382 R
(58) Field of Classification Search ............. 73/382 G, 73/382 R
See application file for complete search history.

(56) References Cited

U.S. PATENT DOCUMENTS

| | | | | |
|---|---|---|---|---|
| 3,630,086 A | * | 12/1971 | Wilk .......................... | 73/382 R |
| 5,339,684 A | | 8/1994 | Jircitano et al. ........... | 73/178 R |
| 5,357,802 A | | 10/1994 | Hofmeyer et al. ......... | 73/382 G |
| 5,359,889 A | | 11/1994 | Jircitano et al. ........... | 73/178 R |
| 5,402,340 A | * | 3/1995 | White et al. ................... | 702/5 |
| 5,734,104 A | * | 3/1998 | Panenka ................... | 73/382 G |
| 5,922,951 A | * | 7/1999 | O'Keefe et al. ............ | 73/382 G |
| 5,962,782 A | | 10/1999 | O'Keefe et al. ............ | 73/382 R |
| 6,278,948 B1 | | 8/2001 | Jorgensen et al. ............. | 702/6 |
| 6,658,935 B1 | | 12/2003 | Feinberg .................... | 73/382 G |
| 6,734,104 B2 | | 5/2004 | Hara et al. .................. | 438/692 |
| 6,799,459 B2 | * | 10/2004 | Dosch et al. ............... | 73/382 G |
| 7,181,967 B2 | | 2/2007 | Lee ............................ | 73/382 G |
| 2003/0033086 A1 | | 2/2003 | Lee et al. ......................... | 702/5 |
| 2003/0209070 A1 | | 11/2003 | Dosch et al. ............... | 73/382 G |

FOREIGN PATENT DOCUMENTS

| | | |
|---|---|---|
| WO | WO 02/103398 | 12/2002 |
| WO | WO 03/032015 | 4/2003 |
| WO | WO 03/076970 | 9/2003 |

OTHER PUBLICATIONS

Li, Yaoguo, "Processing gravity gradiometer data using an equivalent source technique," *Gravity and Magnetics Research Consortium*, Deparment of Geophysics, Colorado School of Mines, Golden Co.
International Search Report for PCT/US05/47098.

* cited by examiner

*Primary Examiner*—Hezron E. Williams
*Assistant Examiner*—Tamiko D Bellamy
(74) *Attorney, Agent, or Firm*—McDonnell Boehnen Hulbert & Berghoff LLP

(57) ABSTRACT

An accelerometer and rate sensor package to aid gravity gradiometers is provided. The accelerometer and rate sensor package is mounted directly on or within a gravity gradiometer instrument (GGI). Outputs from the sensors can be used to reduce unwanted noise due to angular rotational rates, angular accelerations and linear accelerations that may be coupled to the GGI. Since the sensor assembly is directly mounted on or within the GGI, the sensor assembly is coupled to the GGI and senses the acceleration and angular rates as seen by the GGI. Thus, outputs from the GGI can be corrected more effectively using the sensor assembly's outputs.

19 Claims, 5 Drawing Sheets

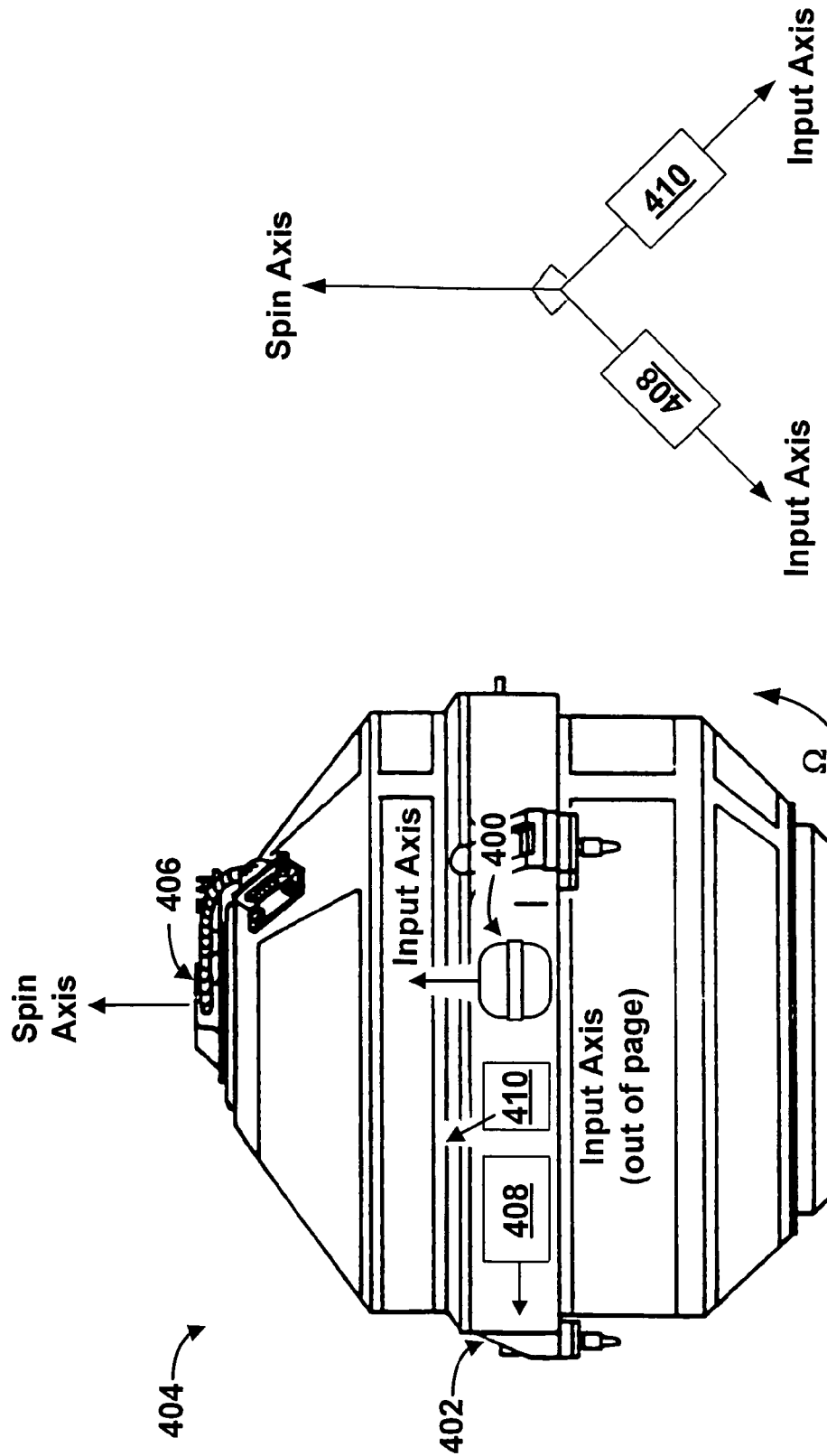

ACCELEROMETER AND RATE SENSOR PACKAGE FOR GRAVITY GRADIOMETER INSTRUMENTS

FIELD OF INVENTION

The present invention relates to methods for processing gravity gradiometer geophysical survey data, and more particularly, to reducing noise within gravity gradiometer measurements resulting from motions of a survey vehicle carrying the gravity gradient measuring instrument.

BACKGROUND

Gravity surveying is one technique in modern exploration for mineral and petroleum commodities. For example, detection of geophysically significant subsurface anomalies potentially associated with ore bodies or hydrocarbon deposits can be made using gravity surveying techniques since the existence of gravitational anomalies usually depends upon the presence of an excess or deficit mass associated with the deposit. At any observation point within an arbitrary volume unit, the gravity field at that observation point can be resolved into x,y,z components with respective magnitudes that are a function of the location of that observation point relative to any mass inhomogeneities. And, the gravitational field can be directly related to geological structures and anomalous densities such as salt, or massive sulfides, for example. When used in conjunction with other geological data, gravity survey data helps to confirm the true geometry of a geological shape before drilling, for example.

As one example, the gravitational anomaly of a body of ore with a density contrast of 300 kg m$^{-3}$ and a dimension of 200 m buried at a depth of 100 m is typically $20 \times 10^{-6}$ ms$^{-2}$, for example, which is about 0.00002% of the normal Earth gravity field. This relatively small effect is normally measured in units of milli gals (mGal), which is the unit for the free air and Bouguer gravity field measurements and is equivalent to $10^{-5}$ m/s$^2$. Thus, for the above example, the body of ore would be represented by about 2 mGal.

Some geophysical prospecting has progressed towards gravity gradiometry. In principle, measurement of a gradient of a gravity field over a known baseline allows accelerations due to motion of the platform itself to be cancelled out. Gravity gradients are the spatial derivative of the gravity vector field (e.g., a second order derivative of the gravitational potential), and have units of mGal per unit distance such as mGal/km. The standard unit of gravity gradiometry is the Eötvös (E), which is equal to $10^{-9}$ s$^{-2}$ or a tenth of a mGal over a kilometer (e.g., gradient signatures of shallow Texas salt domes are typically 50-100 E).

Gravity-Gradient Instruments (GGI) are used to measure the gravity gradients over an area. However, vibrations of a vessel carrying the GGI or other forces may cause the GGI to rotate a few milli-radians about the x or y body axes of the GGI. GGI measurements can be affected by such rotations. For example, such rotations cause accelerometers within the GGI to sense a centripetal acceleration. The centripetal acceleration results in a measured centripetal gradient that cannot be distinguished within the measured gravity gradients. For example, a rotation rate of $3.1 \times 10^{-4}$ radians per second will generate an apparent gravity gradient of approximately 1E. Further, because the magnitude of the centripetal acceleration is related to the tangential speed and angular velocity as follows:

$$A_c = \frac{v_t^2}{r} = r \times \omega^2 \quad \text{Equation (1)}$$

where r is the radius of the rotations and ω is the angular rate of the rotations, then the gradient (e.g., the first derivative with respect to r) is $\omega^2$, and this squared product may translate effects from higher frequency angular rotation rates into low frequency noise. Measured signals may then be distorted if the low frequency noise is in the same frequency range as the measured signal, for example.

As a solution, GGIs are usually angularly decoupled from the vessel (e.g., marine or aircraft vessel) that carries the GGI. Decoupling can be accomplished by mounting the GGI on a gyro-stabilized table. Unfortunately, however, such stabilized tables may only be able to isolate the GGI from rotational rates up to a certain frequency (e.g., up to 20 Hz) due to the mass of the table, which in turn, is driven by the size and weight of the GGI, the compliance between the stable table and the gyroscopes, and the gain versus frequency of applied torque, for example. Thus, higher frequencies of vessel motion, such as mechanical and acoustical noise including engine and propeller noises may not be eliminated, and may be included in measurements by the GGI.

GGI measurements can also be affected by misalignment errors within the mechanics of the instruments. For example, GGIs include mechanical assemblies either directly or as part of the instrumentation system. Because the GGIs are not perfect, the GGIs can include mechanical alignment errors that can cause errors in measurements. The alignment errors can vary over time, environmental conditions and environment history, for example, such as power shut down resulting in large temperature changes, shock due to equipment handling and hard landings, and pressure and humidity changes.

Further, GGIs contain mechanical or electro/mechanical devices to measure the changes in local gravity forces. Such devices may include an accelerometer that has a proof mass, which is restrained by either electrical or mechanical means. The electrical or mechanical restraining force, when properly scaled, is a direct measure of the sum of both acceleration and gravity forces. Because the proof mass cannot be completely restrained to zero motion in any and all directions at all times, non-linearities can occur in output measurements. These non-linearities include the squared, cubic and higher order terms of the applied force and the cross product terms of the orthogonal forces, e.g., $F(K1x+K2x^2+K3x^3+K4xy+K5xz+K6yz+K7zz+K8yy)$. In this example, F is the applied gravity and acceleration force in each direction, and K1 represents the scaling of the linear term and thus scales the desired output. K2 through K8 are typically 1/10^6 to 1/10^7 as compared to K1. However, since measured differences in gravity force on the order of 1/10^11 are desired, such nonlinearities become significant.

SUMMARY

Within embodiments disclosed herein, a gravity gradiometer is described that includes an accelerometer and one or more angular rate sensors. The accelerometer measures an acceleration along an input axis, and is mounted such that the input axis is parallel to an axis of rotation of the gravity gradiometer. The one or more angular rate sensors measure an angular rate along an input axis, and are mounted such that each input axis of the one or more angular rate sensors is orthogonal to each other.

In another aspect, a method of compensating gravity gradient measurements is described. The method includes receiving outputs from one or more angular rate sensors that are directly coupled to a gravity gradiometer. The one or more angular rate sensors measure an angular rate along an input axis, and are mounted such each input axis of the one or more angular rate sensors is orthogonal to each other and orthogonal to an axis of rotation of the gravity gradiometer. The method further includes calculating a centripetal gravity gradient of the gravity gradiometer using the outputs from the one or more angular rate sensors, and subtracting the centripetal gravity gradient from a gravity gradient measured by the gravity gradiometer.

The method may additionally or alternatively include calculating a misalignment correction term using the outputs from the one or more angular rate sensors. The misalignment correction term compensates for alignment errors within the gravity gradient measure by the gravity gradiometer. The method may then include subtracting the misalignment correction term from a gravity gradient measured by the gravity gradiometer.

Furthermore, the method may additionally or alternatively include receiving outputs from an accelerometer of a gravity gradiometer that measures an acceleration along an input axis, and is coupled to the gravity gradiometer such that the input axis is parallel to an axis of rotation of the gravity gradiometer. The method may further include calculating a correction term using the outputs from the accelerometer that compensates for non-linearities within the gravity gradient, and subtracting the correction term from the gravity gradient measured by the gravity gradiometer.

These as well as other features, advantages and alternatives will become apparent to those of ordinary skill in the art by reading the following detailed description, with appropriate reference to the accompanying drawings.

BRIEF DESCRIPTION OF FIGURES

FIG. 4 illustrates one example of rate sensors and an accelerometer mounted to a gravity gradient instrument.

FIG. 5 illustrates one example of an arrangement of the rate sensors.

DETAILED DESCRIPTION

Figure 1A:
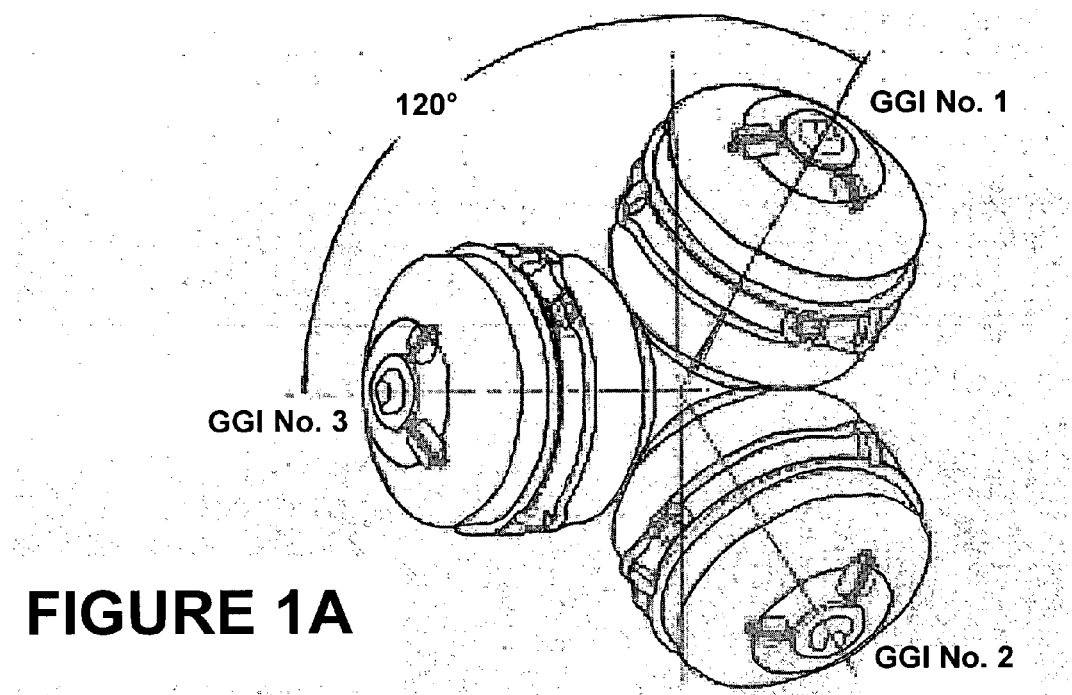
FIGS. 1A-1B illustrate one example of an arrangement of gravity gradient instruments.

In one example, a sensor assembly is provided to improve the performance of GGI systems. More particularly, the sensor assembly includes accelerometers and angular rate sensors that are mounted directly on or within a Gravity Gradiometer Instrument (GGI). Outputs from the sensor assembly can be used to compensate for unwanted noise measurements due to angular rotational rates, angular accelerations and linear accelerations that may be coupled to the GGI. Thus, outputs from the sensor assembly can be used to compensate for noise measurements induced by centripetal, misalignment and non-linear effects associated with GGI measurements.

Since the sensor assembly is directly mounted on or within the GGI, the sensor assembly is coupled to the GGI and senses the acceleration and angular rates as seen by the GGI. Thus, outputs from the GGI can be corrected more effectively, for example, using the sensor assembly's outputs rather than using outputs from sensors decoupled from the GGI. For example, a rate sensor may be coupled to the GGI in a manner so as to measure a centripetal gradient as seen by the GGI. The centripetal gradient can then be removed from GGI outputs to reveal true outputs due to changes of a local gravity field perturbed by the presence of one or more masses (e.g., subterrain mass).

I. Survey Flying and Gravity Gradiometer Instruments (GGI)

A geophysical survey is conducted, using specialized instruments, by flying over a terrain of interest at a low altitude of 100 m, for example. A series of nominally parallel survey lines can be flown until the total region to be surveyed has been covered. The specialized instruments include inertial platforms and geophysical instrument systems including a radar altimeter, a gradiometer (GGI), a magnetic sensor, a light detection and ranging (LIDAR) sensor, an electromagnetic sensor, and a differential global positioning system (DGPS) sensor, for example. Some of these components can be combined into one component, such as including the gravity Radiometer within a Full Tensor Gradient (FTG) instrument, such as the FTG System developed and manufactured by Lockheed Martin®, for example.

A geophysical survey is conducted to measure the gravity field over an area, for example. A GGI can measure the spatial rate of change of the Earth's gravity field and provide a signal from which the instantaneous gradient of gravity can be derived. (Note that a measurement of gravity gradient may be preferred for detection of gravity disturbances from an airborne platform because a direct measurement of gravity can not distinguish the gravity signal from accelerations of the instrument associated with the motion of the aircraft). Using gravity gradient signals, detection of geophysically significant subsurface anomalies potentially associated with ore bodies or hydrocarbon deposits can be made since the existence of gravitational anomalies usually depends upon the presence of an excess or deficit mass associated with the deposit.

A geophysical survey may be conducted with one or more GGIs. For example, a system including an FTG instrument that has three GGIs can be used. The three GGIs may be oriented in a manner such that, unlike a conventional gravimeter that offers data collection only in the vertical (z) direction, the three GGI system may acquire data from all directions.

Figure 1B:
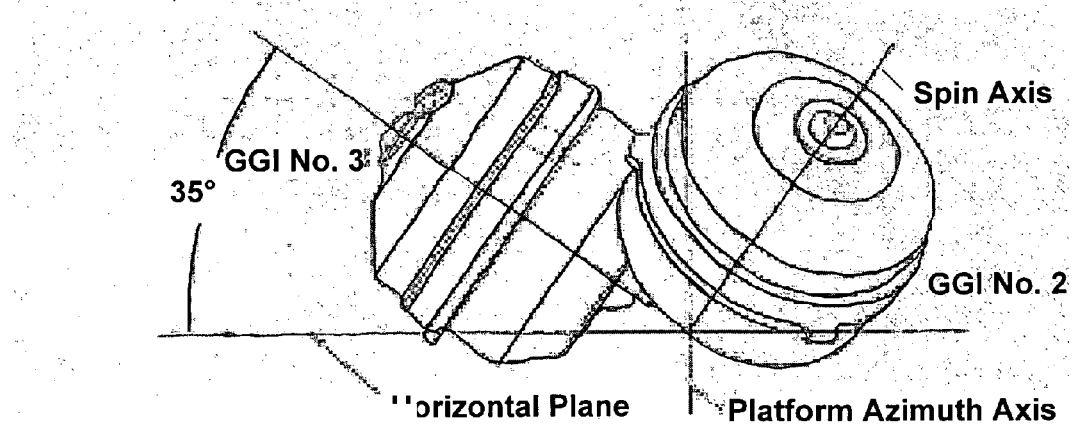

FIGS. 1A and 1B illustrate embodiments of an orientation of three GGIs, such as within an FTG instrument. FIG. 1A illustrates that each of the GGIs is oriented at 120° from each other relative to a plane through the center of each GGI and the platform azimuth axis. Further, each GGI is positioned such that it is approximately 35° from a horizontal plane (e.g., and approximately 55° from a vertical plane) as shown in FIG. 1B. This is one unique configuration in which the three GGI axes are mutually perpendicular in addition to each forming an equal angle with the vertical axis. Using the configurations illustrated in FIGS. 1A and 1B, the three GGI system may collect data from all directions. The GGI's may be mounted on a three gimbaled stabilized platform. The azimuth gimbal can be set to carousel (e.g., rotate) at a commanded rate, such as 300 degrees/hour, for example. Rotation of the GGI's through all the planes may allow for improved noise reduction, for example.

The GGIs illustrated in FIG. 1 may be any type of GGI such as, for example, the type described in U.S. Pat. No. 5,357,802 to Hofmeyer, et al., entitled "Rotating Accelerometer Gradiometer," which is entirely incorporated herein by reference, as if fully set forth in this description. Other GGIs may be used as well.

The GGIs of the FTG instrument in FIG. 1 measure gradients of the nine tensor components of the gravity gradient tensor. The gradient (e.g., first derivative) of the gravitational acceleration is expressed by a symmetric tensor $T_{\mu\nu}$ defined as:

$$T_{\mu\nu} = \begin{bmatrix} Txx & Txy & Txz \\ Tyx & Tyy & Tyz \\ Tzx & Tzy & Tzz \end{bmatrix} \quad \text{Equation (2)}$$

where the components of the tensor $T_{\mu\nu}$ describe the nine components of the gravity gradients and $T_{\mu\nu}$ is the rate of change of the u component of the gravity vector with displacement in the v direction. Five of the tensor components are independent, and four are redundant as follows:

Txy=Tyx

Txz=Tzx

Tyz=Tzy $Tzz=-(Txx+Tyy)$ Equation (3)

The first three conditions in Equation (3) arise from the potential field relations, and the forth condition is a consequence of the gravitational potential being a solution to the Laplace equation.

Further, inline components of the gravity gradient tensor are defined as the Txx, Tyy, and Tzz components, and cross components are defined as the Txy, Txz and Tyz components. For example, cross signals are gradients measured when any two accelerometers align horizontally. In-line gradients are measured when the same accelerometers are at a 45 degree angle to horizontal. A gravity gradiometer outputs one cross and one inline signal. Thus, an FTG that includes three GGIs will output three inline and three cross signals.

II. Accelerometer Package for Gravity Gradiometer Instruments

A gravity gradiometry system internally includes one or more rotating discs with accelerometers to sense accelerations in the X, Y, and Z directions. The discs are mounted within a GGI. For example, the GGI (e.g., within a full tensor gradiometer (FTG)) may include three discs, each mounted in a respective plane that is coincident or parallel with one of the three body-axis planes (referred to as "mounting plane") of the GGI, such that a spin axis of the disc is perpendicular to the mounting plane.

Gravity gradients can then be determined by the difference in readings between opposing pairs of accelerometers on the discs. For example, the GGI measures difference in the intensity of a first gravitational field by moving an accelerometer via a circular path between two spaced-apart locations. If the disc were oriented in a plane perpendicular to the surface of the earth, upon rotation of the disc, the accelerometer on the disc would pass through one location in the direction of the earth's gravitational field and through a second location a small distance from the first location, in the direction opposite to the gravitational field. The gravity gradient T is measured in terms of difference of gravitational acceleration between the two locations, and the distance between the two locations. The gradient is given by the difference of two accelerometer outputs divided by the distance (e.g., in centimeters) between the two locations, for example.

Figure 2A:
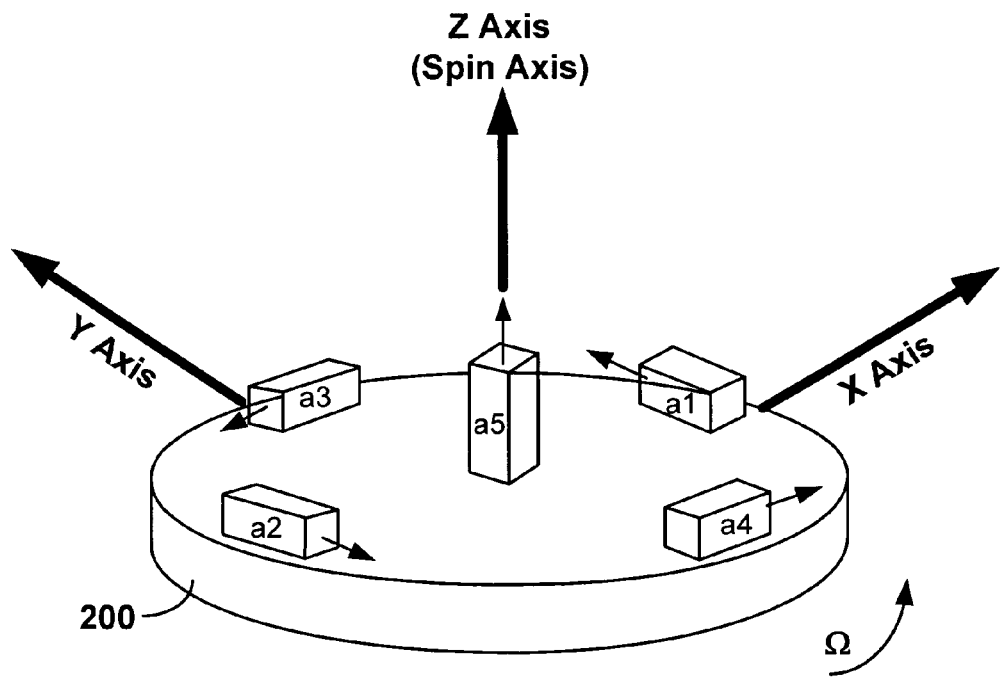
FIGS. 2A-2B illustrate one example of a gravity gradient instrument disc including an arrangement of accelerometers.
Figure 2B:
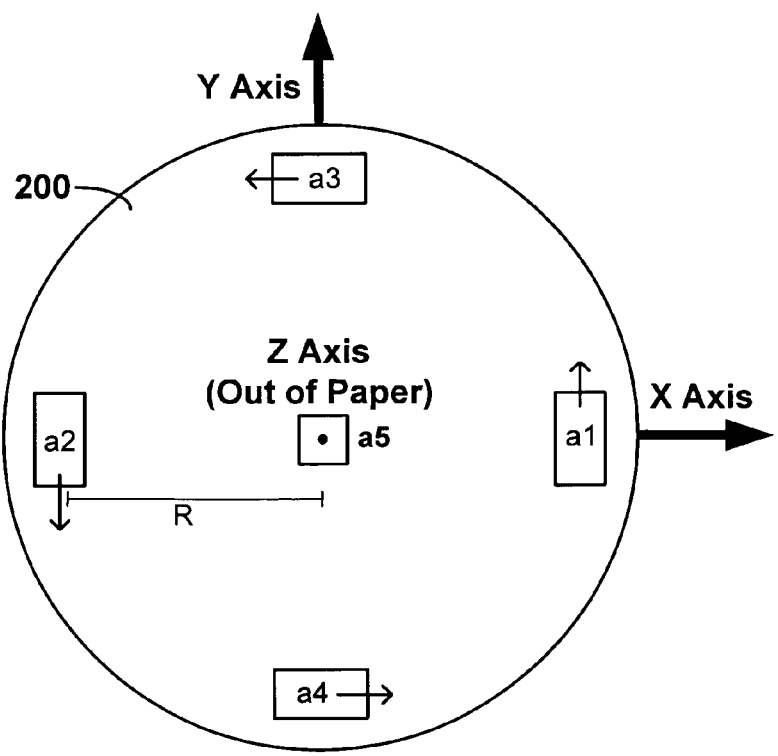

FIGS. 2A and 2B illustrate one embodiment of a rotating disc 200 including accelerometers that may be used within a GGI. FIG. 2A is a side view of the disc 200 and FIG. 2B is a top view of the disc 200. The disc assembly includes a circular substrate, which serves to support accelerometers. The disc 200 may be mounted within a GGI such that the Z axis of the disc 200 is parallel with the spin axis of the GGI (as defined in FIG. 1B).

The disc 200 is shown to include five accelerometers a1-a5. Accelerometers a1 and a2 are positioned opposite one another, accelerometers a3 and a4 are positioned opposite one another, and accelerometer a5 is positioned at the center of the disc 200. The opposing pairs of matched accelerometers (a1-a2 and a3-a4) may be mounted 10 cm apart, for example. Alternatively, the accelerometers a1-a4 may be equi-spaced on the disc 200 such that pairs of accelerometers are mounted π radians apart on the disc 400 and each individual accelerometer is mounted π/2 radians apart on the disc 200. Further, the accelerometers a1-a4 may be mounted to the disc 200 such that their input axis is a radius R from the spin axis (input axes are denoted by the arrow on the accelerometers). The accelerometers a1-a4 input axes are shown to be perpendicular to the radius R; however, the input axes may be oriented at other angles relative to the radius R.

The accelerometers a1-a4 are mounted with their sensitive axes (e.g., input axis) tangential to the circle with the same sense (e.g., the accelerometers sensitive axis is denoted by arrows). Accelerometers a1-a4 sense an acceleration along the X and Y axes, and accelerometer a5 senses an acceleration along the Z axis (e.g., denoted the spin axis in FIG. 2A). Thus, the accelerometer a5 is mounted so that its input axis is parallel with the spin axis, and the accelerometer a5 may then sense an acceleration that is perpendicular to the acceleration sensed by accelerometers a1-a4.

The disc 200 rotates at a commanded rate, such as 0.5 Hz, for example, about an axis perpendicular to the sensitive axes of the accelerometers (e.g., the Z axis or the spin axis). Data then can be sampled at high rates of 128 Hz, for example.

Figure 3B:
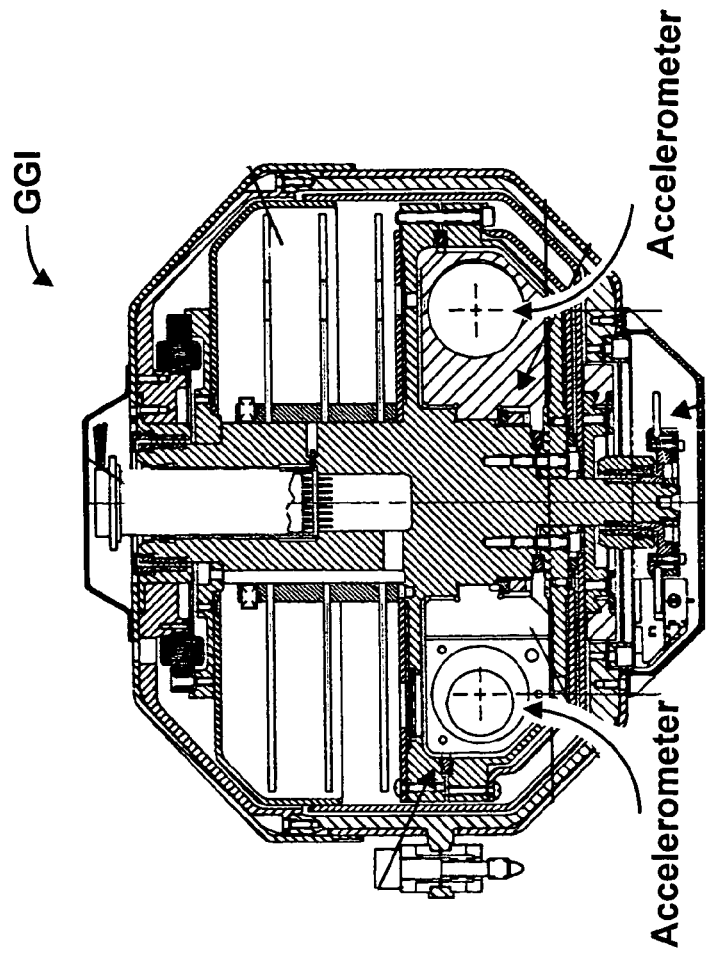
FIG. 3B illustrates one example of an arrangement of accelerometers within a gravity gradient instrument.
Figure 3A:
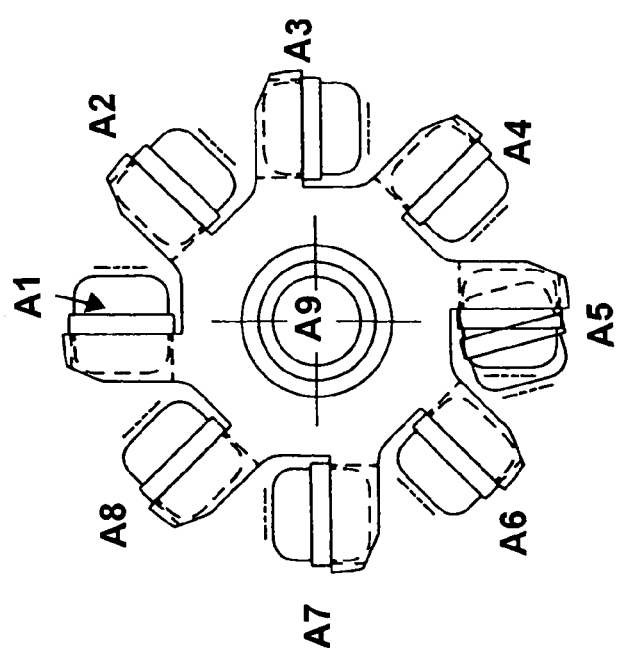
FIG. 3A illustrates another example of an arrangement of accelerometers.

It should be understood that the accelerometer arrangement and other arrangements described herein are set forth for purposes of example only, and other arrangements and elements can be used instead and some elements may be omitted altogether. For example, the disc 200 may include more or less accelerometers, such as a total of nine accelerometers, with one accelerometer mounted vertically in the center of the disc 200 and the remaining eight accelerometers spaced π/4 radians apart horizontally on the disc 200. This arrangement is illustrated in FIG. 3A. FIG. 3B illustrates a cross-sectional view of the accelerometers within the GGI. The center accelerometer is not shown in FIG. 3B. Other arrangements are possible as well.

Referring back to FIG. 2, the disc 200 may also include other multiples of four accelerometers positioned horizontally on the disc about a common axis with one or more accelerometers positioned vertically on the disc along the spin axis. The accelerometers may be of any type and one example includes the AQ2000 Q-Flex® available from Honeywell International, Inc. in Redmond, Wash.

Accelerometers on the disc 200 could also be mounted to the exterior of a GGI. For example, the vertically mounted accelerometer (a5 in FIG. 2) could be mounted to the exterior or the case of the GGI. In this manner, the accelerometer is coupled to the GGI such that it is isolated from other frequencies. (Rate sensors may also be positioned on GGI the platform itself to sense accelerations of the GGI platform). FIG. 4 illustrates a vertically mounted accelerometer 400 mounted to a bracket 402 of a GGI 404. However, the accelerometer 402 may be mounted anywhere on the GGI 404, such as on a top 406 or on the side of the GGI 404, as long as an input axis of the accelerometer 402 is parallel with the spin axis of the GGI 404.

Since the accelerometer a5 is directly mounted on or within the GGI 404, the accelerometer a5 will measure the accelerations orthogonal to the accelerations which the accelerometers a1-a4 experience. Thus, outputs from the accelerometer a5 can be used to more accurately measure the acceleration environment experienced by accelerometers a1-a4, for example. This allows for improved removal of errors due to non-linearities and misalignments of accelerometers a1-a4.

Referring back to FIG. 2, the disc 200 is shown to spin in a counterclockwise direction at a constant rate of $\Omega$ radians/second. Each accelerometer provides a sinusoidally varying analog output that is a function of the acceleration experienced by each accelerometer as the accelerometer orbits the spin axis. In a uniform gravity field, each member of an opposing pair of accelerometers generates the same output as it proceeds along its orbital path. However, when the local gravity field is perturbed by the presence of one or more masses (e.g., sub-terrain mass), each accelerometer will experience different accelerations throughout its orbit. The quantitative output of each accelerometer, coupled with its rotary position, provides information related to the local gravity gradients.

Thus, the electric signal output from the accelerometers serves as a measure of any forces, including the force of gravity and vehicle accelerations, which may be applied to the accelerometers. As noted above, the gradient T is defined by the difference of gravity induced force measured by accelerometers at two spaced-apart locations divided by the spacing between the two locations. A GGI may include (or be in communication with) a processor that may execute instructions to calculate a gravity tensor element as a function of the forces measured by the accelerometers a1-a4, as described in U.S. Pat. No. 5,357,802 to Hofmeyer, et al., which is entirely incorporated herein by reference.

Outputs from accelerometers a1-a4 can be demodulated to measure acceleration and gravity induced forces in the plane of rotation (e.g., in the X-Y plane), and outputs from accelerometer a5 can measure acceleration and gravity induced forces along the spin axis (e.g., the Z axis), for example.

III. Rate Sensor Package for Gravity Gradiometer Instruments

A GGI (e.g., in an FTG arrangement as shown in FIG. 1) also may include a rate sensor package. In particular, the GGI may include one or more angular rate sensors directly mounted on or within the GGI. FIG. 4 illustrates two angular rate sensors 408 and 410 mounted to the bracket 402 of the GGI 404. The angular rate sensors may be any type, such as the ARS-09 MHD angular rate sensor available from Applied Technology Associates (ATA) Sensors in Albuquerque, N. Mex., for example.

As shown in FIG. 4, the two angular rate sensors 408 and 410 are mounted such that input axes of each of the sensors 408 and 410 are orthogonal. The sensors 408 and 410 may be mounted in any arrangement as long as their input axes are orthogonal, and such that the two angular rate sensors 408 and 410 are mounted to measure rates of rotation about two axes that are perpendicular to each other and perpendicular to the axis of rotation (e.g., the spin axis). Thus, the input axes of the two rate sensors 408 and 410 and the spin axis will each be orthogonal to each other. This arrangement is illustrated in FIG. 5.

The angular rate sensors 408 and 410 measure the angular rotational rate of the GGI in a given axis. Thus, using two angular rate sensors, the angular rate for two axes can be measured. The angular rate sensors 408 and 410 may be mounted on the bracket 402 next to the accelerometer 400, or the sensors 408 and 410 may be mounted elsewhere on or in the GGI in a manner such that the input axis of each sensor 408 and 410 and the spin axis are all orthogonal to each other.

Since the angular rate sensors 408 and 410 are mounted directly on the GGI 404, the angular rate sensors 408 and 410 will measure the same angular rate that the GGI 404 experiences, and that the accelerometers a1-a4 experience. Thus, outputs from the angular rate sensors 408 and 410 can be used to remove the unwanted noise within GGI measurements due to angular rates sensed by the accelerometers a1-a4.

IV. Compensation for Centripetal Acceleration Effects on GGI Measurements

Vibrations of a vessel carrying the GGI or other forces may cause the GGI to rotate about the X or Y body axes of the GGI. GGI measurements can be affected by such rotations. For example, the rotations cause accelerometers within the GGI to sense a centripetal acceleration. The centripetal acceleration results in a measured centripetal gradient that cannot be distinguished from measured gravity gradients. The apparent gravity gradient is proportional to the square of the instantaneous angular rate. For example, rotations of $$\frac{1}{10^9}$$

radians per second squared are equivalent to 1E, and if measurements on the order of 2E are desired, then such rotations can distort desired signals. GGIs are usually angularly decoupled from the vessel (e.g., marine or aircraft vessel) that carries the GGI by mounting the GGI on a gyro-stabilized table. Although the stabilized table can reduce the magnitude of the vibration induced rotations of the GGI, it may be impossible to fully eliminate such rotations using the stabilized table. Further, the stabilized table may only be able to isolate the GGI from rotational rates up to a certain frequency (e.g., up to 10 to 30 Hz).

In one embodiment, outputs from the angular rate sensors 408 and 410 can be used to remove centripetal gradient measurements within outputs of the GGI. The angular rate sensors 408 and 410 can capture high frequency rotational rates since the angular sensors 408 and 410 are directly coupled to the GGI 404.

A gravity gradient due to accelerations sensed by the accelerometers a1-a4 related to local sub-terrain mass is a true gravity gradient. In one embodiment, the true gravity gradient can be approximated as follows:

true gravity gradient=gravity gradient output from GGI−centripetal gradient                Equation (4)

where the centripetal gradient can be found as follows:

centripetal gradient=($A$*rate sensor output)$^2$                Equation (5)

where A is a scaling factor to translate the rate sensor outputs into $$\frac{rad}{s^2}.$$

Figure 6:
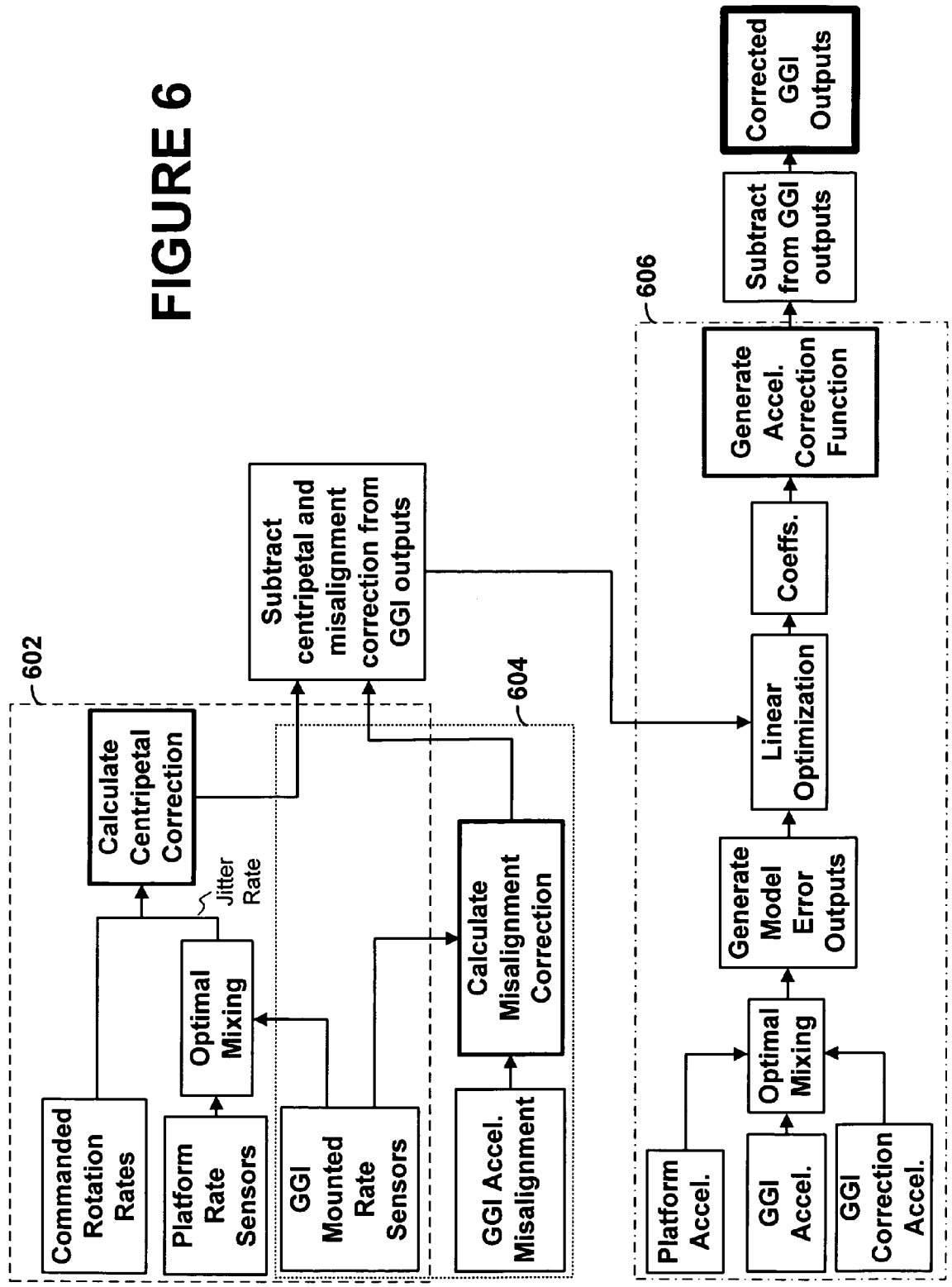
FIG. 6 is a flowchart depicting one embodiment of compensating the GGI measurements.

FIG. 6 is a flowchart depicting one embodiment of compensating the GGI measurements. For example, at box 602, a centripetal correction value is calculated, which can be subtracted from the GGI outputs to determine a true gravity gradient.

In particular, for example, the centripetal contributions to the 3 inline GGI outputs ($i_1, i_2, i_3$) and the 3 cross GGI outputs ($c_1, c_2, c_3$) are given by:

$$i_1 = 10^9 \cdot (\Omega_v^2 - \Omega_w^2)/2$$

$$i_2 = 10^9 \cdot (\Omega_w^2 - \Omega_u^2)/2$$

$$i_3 = 10^9 \cdot (\Omega_u^2 - \Omega_v^2)/2 \qquad \text{Equation (6)}$$

$$c_1 = 10^9 \cdot (\Omega_v \Omega_w)$$

$$c_2 = 10^9 \cdot (\Omega_w \Omega_u)$$

$$c_3 = 10^9 \cdot (\Omega_u \Omega_v) \qquad \text{Equation (7)}$$

where $$\Omega_u = C_u + \omega_u$$

$$\Omega_v = C_v + \omega_v$$

$$\Omega_w = C_w + \omega_w \qquad \text{Equation (8)}$$

where $\Omega_i$ is the total rotation rate about the $i^{th}$ axis and is given by the sum of the commanded rate, $C_i$, and the 'jitter' rate sensed by the platform rate sensors and the gradiometer mounted gyros 408 and 410, $\omega_i$, as shown at box 602. (The factor of $10^9$ within Equation (4) is to convert from units of inverse seconds squared to Eotvos units). As further shown at box 602, the jitter rate is obtained by filtering and combining the outputs of the platform and gradiometer mounted gyros 408 and 410. The centripetal contributions to the 3 inline GGI outputs ($i_1, i_2, i_3$) and the 3 cross GGI outputs ($c_1, c_2, c_3$) are then subtracted from the GGI outputs to calculate the centripetally corrected GGI output signal.

V. Compensation for Misalignment Effects on GGI Measurements

GGI measurements can also be affected by misalignment errors within mechanics of the instruments. Because of imperfections within the GGIs, the GGIs can include mechanical alignment errors that can cause errors in measurements induced by angular accelerations of the GGI. For example, input axes of the accelerometers a1-a4 may not be aligned perfectly with the X or Y axes of the GGI 404. Specifically, for example, an accelerometer may be mounted offset at an angle vertically from a desired position due to manufacturing imperfections. Such misalignment errors can vary over time, environmental conditions and environment history, for example. Alignment errors can introduce noise into GGI measurements.

The one or more rate sensors 408 and 410, which are directly mounted on or within the GGI, can provide outputs to correct for such errors. The corrections may be carried out in real time, later in the data reduction process or both. As shown at box 604 in FIG. 6, the misalignment correction is calculated using the rate sensor outputs and a GGI acceleration misalignment calculation. The misalignment calculation is a predetermined number, e.g., $10^{-6}$ rad, which represents an estimated misalignment of the GGI accelerometers not pointing in the plane of the disc.

In particular, in one embodiment, the outputs from the rate sensors 408 and 410 can be used to calculate a correction signal, which can be subtracted from GGI measurements to compensate for any misalignment errors. For example, errors due to accelerometer misalignment can be removed from the GGI output by matching the GGI output to the rate sensor output using linear optimization. This is a mathematical technique that matches correlations between one signal and a set of other signals. First, a time-derivative of the rate sensor outputs is taken to convert the outputs from angular rates to angular accelerations, as shown below in Equation (9):

$$\alpha_i^j = r_{(i+1)}^j - r_i^j \qquad \text{Equation (9)}$$

where $r_i^j$ is the $i^{th}$ output from the $j^{th}$ rate sensor, and $\alpha_i^j$ is the $i^{th}$ output of the $j^{th}$ angular acceleration term. If the rate sensors are not rotating about the GGI axis in the same manner as the GGI accelerometers on the disc then these angular accelerations are modulated to take into account any additional or differential rotation. Modulating the angular accelerations splits the angular acceleration into two terms, as shown below in Equations 10-11:

$$m_i^{jc} = \alpha_i^j \cos(2\omega t_i) \qquad \text{Equation (10)}$$

$$m_i^{js} = \alpha_i^j \sin(2\omega t_i) \qquad \text{Equation (11)}$$

where $t_i$ is the time in seconds of the $i^{th}$ output, and $\alpha_i^j$ is the rate of GGI rotor rotation expressed in radians per second. The angular acceleration terms, e.g., $m^{jc}$ and $m^{js}$ (or $\alpha^j$ if modulation is not required) are then matched to the GGI output by means of linear optimization. This can be accomplished either in the time domain or in the frequency domain. The output of the linear optimization is a set of amplitude coefficients including one for each of the input functions. The misalignment correction signal due to each angular acceleration term is found by multiplying the angular acceleration term by its coefficient. The total misalignment correction is then calculated by summing over the full set of correction signals, for example. The total misalignment correction signal is then subtracted from the GGI output.

VI. Compensation for Non-Linearity Effects on GGI Accelerometer Measurements

GGI measurements can also be affected by imperfections of the accelerometers in other manners as well. For example, the accelerometers are arranged in the GGI so that accelerometers match to each other. This assumes that the accelerometers are perfect, but they are not, in part due to the accelerometers not being perfectly linear (e.g., if x is an input acceleration to an accelerometer, the output may be $K1x + K2x^2 + K3x^3 + K4xy + K5xz + K6yz + K7yy + K8zz \ldots$). Thus, to improve gravity-gradient measurements, the non-linearities can be subtracted.

In one embodiment, outputs from accelerometer a5 can be used to remove the non-linear effects of $K5xz + K6yz + K8zz$, for example, seen in the outputs of the accelerometers a1-a4. And, since accelerometer a5 is directly coupled to the GGI 400, the accelerations sensed by accelerometer a5 will be the same as the accelerations sensed by accelerometers a1-a4, so that the accelerometer's a1-a4 outputs may be corrected accordingly.

In particular, in one embodiment, errors due to accelerometer linearities can be removed from the GGI output by matching the GGI output to the rate sensor output using linear optimization, which is illustrated at box 606 in FIG. 6. An error model is first linearized by combining and modulating accelerometer outputs to form error terms. For example, the following are examples of possible error terms, $a^j a^k,$ $a^k a^k,$ $a^j a^k \cos(\omega t),$ $a^j a^k \sin(2\omega t)$ where $a^j$ and $a^k$ are accelerometer outputs, $\omega$ is the GGI rotor rate in radians per second, and t is time in seconds. The accelerometers used to generate $a^j$ and $a^k$ can either be those intrinsic to the GGI, as used for its gravity gradient measurement (e.g., accelerometers on the disc), or can be extra sensors mounted to the GGI. The error terms are fitted to the GGI output using linear optimization. The output of this process is a set of amplitude coefficients, each one corresponding to an error term. The resultant correction signal is the sum of the error terms, each multiplied by its error coefficient. This correction signal is then subtracted from the GGI output.

Thus, after subtracting the corrections for the centripetal, misalignment and non-linearity signals from the GGI outputs, the GGI outputs may then more closely reflect true gradiometer readings that represent gravity vectors of a gravity reading in a particular area.

The computation processing of the embodiments presented herein can be performed by discrete solid-state functional devices, by software- or firmware-controlled microprocessors or computers, by an application specific integrated circuit (ASIC), or by any combination thereof.

It is intended that the foregoing detailed description be regarded as illustrative rather than limiting, and it is intended to be understood that the following claims including all equivalents define the scope of the invention.

What is claimed is:

1. A gravity gradiometer comprising:
   an accelerometer operable to measure an acceleration along an input axis, the accelerometer mounted such that the input axis is parallel to an axis of rotation of the gravity gradiometer;
   one or more angular rate sensors operable to measure an angular rate along an input axis, the one or more angular rate sensors mounted such that each input axis of the one or more angular rate sensors is orthogonal to each other;
   a disc that rotates about the axis of rotation of the gravity gradiometer; and
   two pairs of accelerometers mounted on the disc such that input axes of the two pairs of accelerometers are perpendicular to the axis of rotation and tangent to a circumference of the disc,
   wherein the accelerometer operable to measure the acceleration along the input axis and mounted such that the input axis is parallel to the axis of rotation of the gravity gradiometer is not one of the paired accelerometers.

2. The gravity gradiometer of claim 1, wherein the accelerometer is mounted internally within the gravity gradiometer.

3. The gravity gradiometer of claim 1, wherein the accelerometer is mounted externally on the gravity gradiometer.

4. The gravity gradiometer of claim 1, wherein the one or more angular rate sensors are mounted such that each input axis of the one or more angular rate sensors is orthogonal to the axis of rotation.

5. The gravity gradiometer of claim 1, wherein the accelerometer is mounted such that the input axis is parallel to the axis of rotation of the disc.

6. The gravity gradiometer of claim 1, further comprising a processor coupled to the disc and operable to calculate gravity tensors as a function of acceleration measured by the two or more multiples of two accelerometers.

7. The gravity gradiometer of claim 6, wherein the processor further calculates a centripetal gravity gradient of the gravity gradiometer using outputs from the one or more angular rate sensors, and subtracts the centripetal gravity gradient from the gravity tensors.

8. The gravity gradiometer of claim 6, wherein the processor further calculates a misalignment correction term of the gravity gradiometer using outputs from the one or more angular rate sensors, and subtracts the misalignment correction term from the gravity tensors.

9. The gravity gradiometer of claim 6, wherein the processor further removes non-linear effects present in the gravity tensors using outputs from the accelerometer that is mounted such that the input axis is parallel to the axis of rotation of the gravity gradiometer.

10. A full-tensor gradient instrument comprising:
    at least three gravity gradiometer instruments jointly operable to acquire data from the x, y, and z coordinate directions, where each gravity gradiometer instrument includes:
    an accelerometer operable to measure an acceleration along an input axis, the accelerometer mounted such that the input axis is parallel to an axis of rotation of the gravity gradiometer instrument; and
    two or more angular rate sensors operable to measure an angular rate along an input axis, the two or more angular rate sensors mounted such that each input axis of the two or more angular rate sensors is orthogonal to each other and orthogonal to the axis of rotation.

11. The full-tensor gradient instrument of claim 10, wherein outputs from the accelerometer and the two or more angular rate sensors are used to correct gravity gradient signals for effects selected from the group consisting of centripetal gravity gradient elements, alignment errors and non-linear effects.

12. A method comprising:
    receiving a gravity gradient recorded by a gravity gradiometer;
    receiving outputs from two or more angular rate sensors that are directly coupled to the gravity gradiometer and that are recorded while recording the gravity gradient, the two or more angular rate sensors operable to measure an angular rate along an input axis, and the two or more angular rate sensors mounted such that each input axis of the two or more angular rate sensors is orthogonal to each other and orthogonal to an axis of rotation of the gravity gradiometer;
    calculating a centripetal gravity gradient of the gravity gradiometer using the outputs from the two or more angular rate sensors; and
    subtracting the centripetal gravity gradient from the gravity gradient measured by the gravity gradiometer.

13. The method of claim 12, wherein the gravity gradient measured by the gravity gradiometer includes three inline outputs and three cross outputs, and wherein centripetal contributions to the three inline outputs are given by $$i_1 = 10^9 \cdot (\Omega^2_v - \Omega^2_w)/2$$

$$i_2 = 10^9 \cdot (\Omega^2_w - \Omega^2_u)/2$$

$$i_3 = 10^9 \cdot (\Omega^2_u - \Omega^2_v)/2$$

and centripetal contributions to the three cross outputs are given by $$c_1 = 10^9 \cdot (\Omega_v \Omega_w)$$

$$c_2 = 10^9 \cdot (\Omega_w \Omega_u)$$

$$c_3 = 10^9 \cdot (\Omega_u \Omega_v)$$

where $$\Omega_u = C_u + \omega_u$$

$$\Omega_v = C_v + \omega_v$$

$$\Omega_w = C_w + \omega_w$$

where $\Omega_i$ is a total rotation rate about an $i^{th}$ axis and is given by a sum of a commanded rate, $C_i$, of the gravity gradiometer and a jitter rate sensed by the two or more angular rate sensors, $\omega_i$.

14. The method of claim 13, wherein the gravity gradiometer is mounted on a platform that includes gyroscopes to sense accelerations, and wherein the jitter rate is obtained by filtering and combining outputs of the platform gyroscopes and outputs of the two or more angular rate sensors.

15. The method of claim 13, wherein subtracting the centripetal gravity gradient from the gravity gradient measured by the gravity gradiometer comprises subtracting the centripetal contributions from the three inline outputs and the three cross outputs of the gravity gradient.

16. A method comprising:
receiving outputs from two or more angular rate sensors that are directly coupled to a gravity gradiometer, the gravity gradiometer operable to measure a gravity gradient from the x, y, and z coordinate directions, the two or more angular rate sensors operable to measure an angular rate along an input axis, and the two or more angular rate sensors mounted such that each input axis of the one or more angular rate sensors is orthogonal to each other and orthogonal to an axis of rotation of the gravity gradiometer;
calculating a misalignment correction term using the outputs from the two or more angular rate sensors by matching the gravity gradient to the outputs from the two or more angular rate sensors using linear optimization, the misalignment correction term compensating for alignment errors within the gravity gradient, and wherein outputs of the linear optimization is a set of amplitude coefficients including one for each angular rate sensor output, and wherein calculating the misalignment correction term includes:
multiplying the outputs from the two or more angular rate sensors by their corresponding amplitude coefficient to produce correction signals, and
adding the correction signals to produce the misalignment correction term; and
subtracting the misalignment correction term from the gravity gradient measured by the gravity gradiometer.

17. The method of claim 16, wherein the gravity gradiometer includes a disc that rotates about an axis of rotation of the gravity gradiometer that includes two or more multiples of two accelerometers mounted on the disc such that input axes of the two or more multiples of two accelerometers are perpendicular to the axis of rotation and tangent to a circumference of the disc, and wherein if the two or more angular rate sensors are not rotating about the axis of rotation in the same manner as the multiples of two accelerometers, the method further comprises:
modulating the outputs from the two or more angular rate sensors; and
matching the modulated outputs to the to the gravity gradient using linear optimization.

18. A method comprising:
receiving outputs from an accelerometer of a gravity gradiometer, the accelerometer operable to measure an acceleration along an input axis, and the accelerometer coupled to the gravity gradiometer such that the input axis is parallel to an axis of rotation of the gravity gradiometer, wherein the gravity gradiometer is operable to measure a gravity gradient;
calculating a correction term using the outputs from the accelerometer, the correction term compensating for non-linearities within the gravity gradiometer; and
subtracting the correction term from the gravity gradient measured by the gravity gradiometer.

19. The method of claim 18, wherein calculating a correction term comprises:
matching the gravity gradient to the outputs from the accelerometer using linear optimization to form an error model signal;
fitting the error model signal to the gravity gradient using linear optimization to produce a set of amplitude coefficients, each coefficient corresponding to an error term in the error model signal;
multiplying the error terms by their corresponding amplitude coefficients to produce normalized signals; and
adding the normalized signals to produce the correction term.

* * * * *